(12) United States Patent
Maeda et al.

(10) Patent No.: US 8,201,742 B2
(45) Date of Patent: Jun. 19, 2012

(54) BARCODE PROCESSING APPARATUS AND BARCODE PROCESSING METHOD

(75) Inventors: Masaya Maeda, Kawasaki (JP); Bunpei Irie, Kawasaki (JP); Naotake Natori, Kunitachi (JP); Tomoyuki Hamamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 226 days.

(21) Appl. No.: 12/719,269

(22) Filed: Mar. 8, 2010

(65) Prior Publication Data

US 2010/0301119 A1    Dec. 2, 2010

(30) Foreign Application Priority Data

May 29, 2009    (JP) .................... 2009-131126

(51) Int. Cl.
*G06K 7/10* (2006.01)
(52) U.S. Cl. ............... 235/462.01; 235/462.02; 235/454
(58) Field of Classification Search ............ 235/462.01, 235/462.02, 462.04, 462.16, 454, 494
See application file for complete search history.

(56) References Cited

U.S. PATENT DOCUMENTS

| 4,822,986 A | 4/1989 | Guthmueller et al. |
| 5,369,265 A * | 11/1994 | Adachi et al. ........... 235/462.15 |
| 5,468,945 A | 11/1995 | Huggett et al. |
| 5,523,552 A | 6/1996 | Shellhammer et al. |
| 6,119,071 A * | 9/2000 | Gorenflo et al. ................ 702/85 |

FOREIGN PATENT DOCUMENTS

| EP | 0 589 361 | 3/1994 |
| JP | 2005-266907 | 9/2005 |
| JP | 2008-84218 | 4/2008 |
| WO | WO 96/13803 | 5/1996 |

OTHER PUBLICATIONS

European Search Report dated Sep. 2, 2010.
European Search Report dated Dec. 9, 2010.

* cited by examiner

*Primary Examiner* — Edwyn Labaze
(74) *Attorney, Agent, or Firm* — Pillsbury Winthrop Shaw Pittman, LLP

(57) ABSTRACT

According to one embodiment, a barcode processing apparatus comprises a reading unit configured to read an image of a barcode configured by a plurality of bars laid out at a predetermined interval, each bar being formed by a plurality of ink dots, and a barcode recognition unit configured to filter the read image using a mask which has a width smaller than the predetermined interval and larger than a width of one bar, and corresponds to a length of one bar so as to extract a group of a plurality of ink dots, to couple the plurality of ink dots in the extracted group, to detect one bar based on the coupling result, and to recognize a barcode configured by a plurality of detected bars.

15 Claims, 9 Drawing Sheets

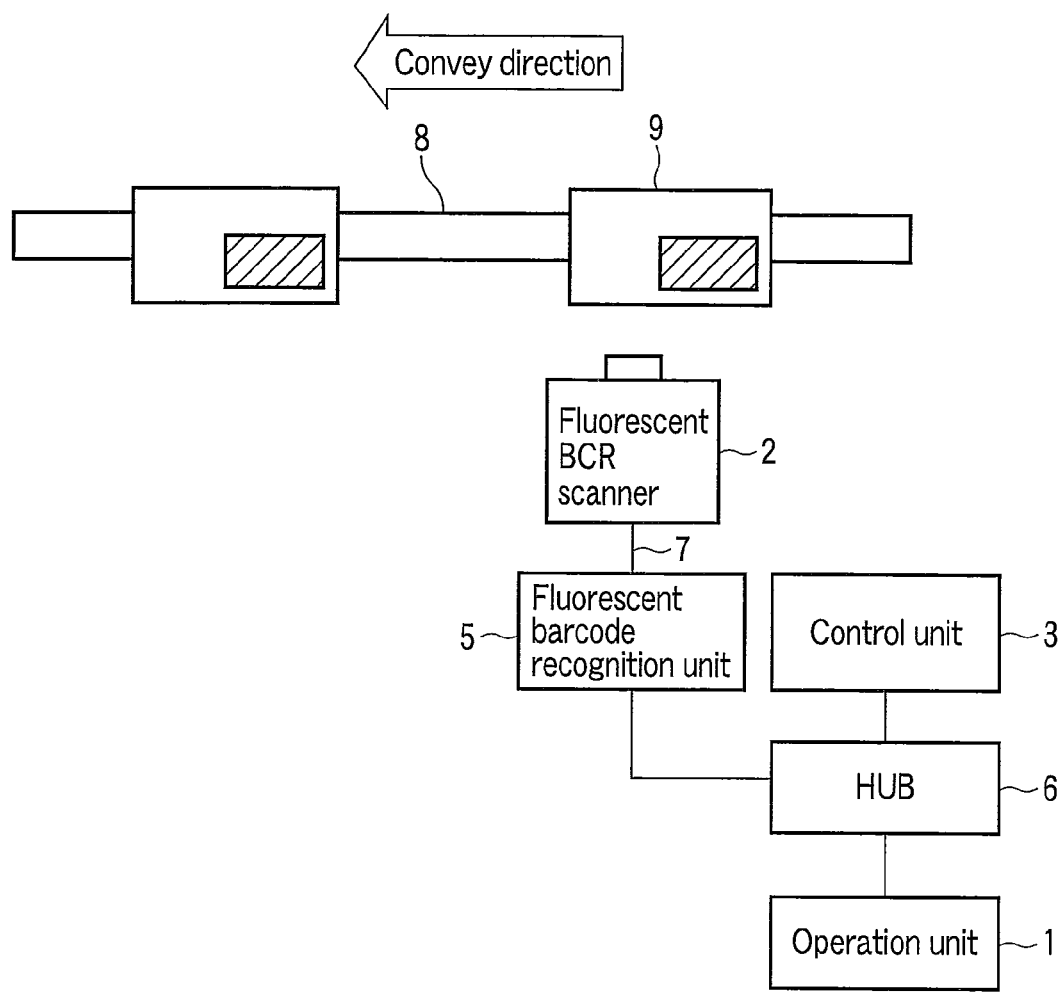
F I G. 1

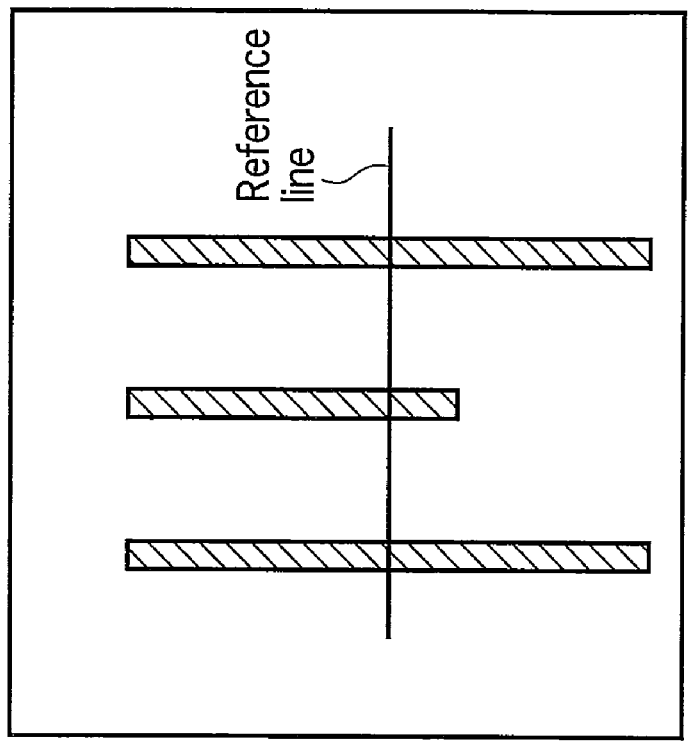
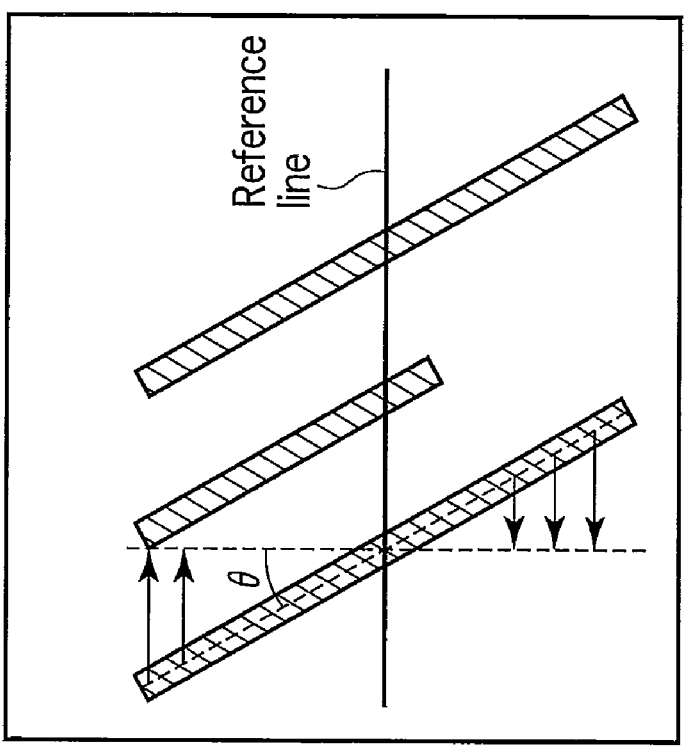
F I G. 9

BARCODE PROCESSING APPARATUS AND BARCODE PROCESSING METHOD

CROSS-REFERENCE TO RELATED APPLICATIONS

This application is based upon and claims the benefit of priority from prior Japanese Patent Application No. 2009-131126, filed May 29, 2009, the entire contents of which are incorporated herein by reference.

BACKGROUND OF THE INVENTION

1. Field of the Invention

The invention relates to a barcode processing apparatus and barcode processing method, which recognize a barcode printed on, e.g., a postal matter.

2. Description of the Related Art

In the field of postal matter processing, it is known that a barcode corresponding to address information is printed on a postal matter. For example, a mail processing machine reads an image of each postal matter which is conveyed at high speed, recognizes address information in the image, and prints a barcode corresponding to the recognized address information on the postal matter. Alternatively, when the mail processing machine cannot recognize address information, an operator visually recognizes a displayed postal matter image and inputs the address information. In response to this, the mail processing machine prints a barcode corresponding to the input address information on the postal matter.

After barcodes are printed on postal matters, the postal matters are processed based on the barcodes. For example, a mail sorting machine reads barcodes printed on postal matters, and sorts the postal matters based on the read barcodes.

In order to accurately sort the postal matters, it is required to accurately read barcodes from postal matter images. As a technique for accurately processing barcodes, for example, Jpn. Pat. Appln. KOKAI Publication Nos. 2005-266907 (reference 1) and 2008-84218 (reference 2) disclose a barcode detection technique for detecting a barcode from a postal matter image and a barcode reading technique for reading a barcode.

However, it is difficult for the aforementioned techniques to correctly recognize bars in a slant state printed on a postal matter.

For example, a mail processing apparatus prints a barcode on a postal matter, which is conveyed at high speed, using an ink-jet printer. For this reason, when adjustment of the postal matter convey speed and the ink-ejection timing of the ink-jet printer is insufficient, bars which configure a barcode are often printed in a tilted (slant) state. It is difficult for the aforementioned techniques to correctly recognize the bars in the slant state.

For example, reference 1 discloses a technique for detecting a barcode by filtering, but it does not disclose any technique about bar detection in the slant state. Also, patent reference 2 discloses technique that copes with a barcode in a skew state, but it does not disclose any technique about bar detection in the slant state.

Note that the barcode in the skew state means a barcode in which the arrangement of bars which configure the barcode are skewed with respect to the convey direction of a postal matter, i.e., a barcode which is entirely printed obliquely with respect to the convey direction of a postal matter. By contrast, a barcode configured by bars in the slant state means a barcode in a state in which respective bars that configure the barcode are slant with respect to the convey direction of a postal matter but the entire barcode is printed along the convey direction of the postal matter.

BRIEF SUMMARY OF THE INVENTION

It is an object of the invention to provide a barcode processing apparatus and barcode processing method, which can assure high recognition accuracy of a barcode in a slant state.

According to one embodiment of the invention, a barcode processing apparatus comprises a reading unit configured to read an image of a barcode configured by a plurality of bars laid out at a predetermined interval, each bar being formed by a plurality of ink dots, and a barcode recognition unit configured to filter the read image using a mask which has a width smaller than the predetermined interval and larger than a width of one bar, and corresponds to a length of one bar so as to extract a group of a plurality of ink dots, to couple the plurality of ink dots in the extracted group, to detect one bar based on the coupling result, and to recognize a barcode configured by a plurality of detected bars.

According to one embodiment of the invention, a barcode processing method comprises reading an image of a barcode configured by a plurality of bars laid out at a predetermined interval, each bar being formed by a plurality of ink dots, and filtering the read image using a mask which has a width smaller than the predetermined interval and larger than a width of one bar, and corresponds to a length of one bar so as to extract a group of a plurality of ink dots, coupling the plurality of ink dots in the extracted group, detecting one bar based on the coupling result, and recognizing a barcode configured by a plurality of detected bars.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic block diagram showing the arrangement of a barcode processing apparatus according to an embodiment of the invention;

FIG. 9 is a view showing generation of a corrected image based on an estimated slant angle θ and heights from a reference line;

DETAILED DESCRIPTION OF THE INVENTION

Figure 2:
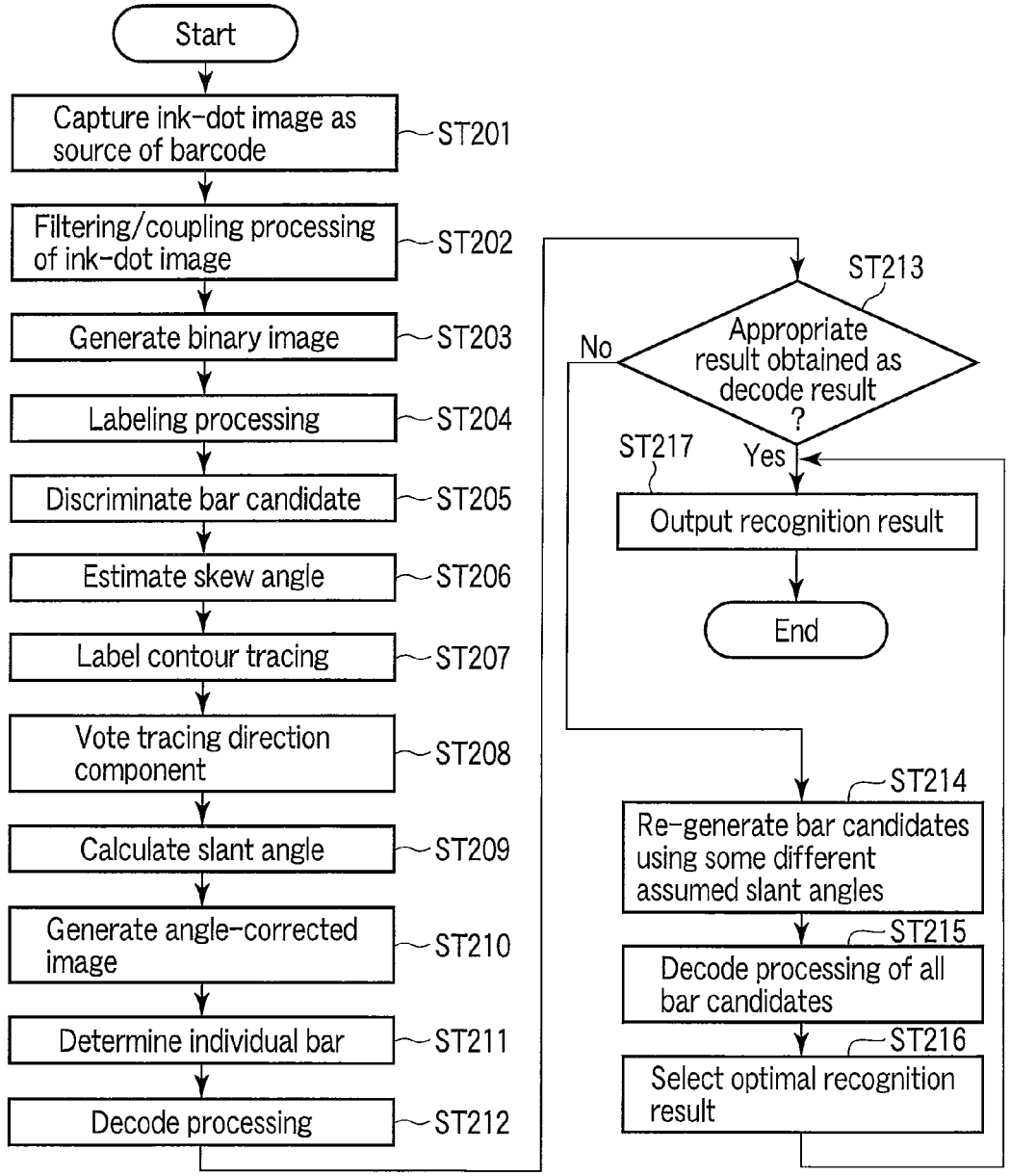
FIG. 2 is a flowchart for explaining an overview of barcode processing according to the embodiment of the invention.

An embodiment of the invention will be described hereinafter with reference to the drawing.

FIG. 1 is a schematic block diagram showing the arrangement of a barcode processing apparatus according to an embodiment of the invention. The barcode processing apparatus can be applied to, for example, a mail sorting machine.

As shown in FIG. 1, the barcode processing apparatus includes an operation unit 1, fluorescent barcode scanner 2, control PC 3, fluorescent barcode recognition unit 5, HUB 6, communication cable 7, and conveyor belt 8.

The fluorescent barcode scanner 2 reads, using invisible light, an image (fluorescent image) of a letter (object to be read) 9 such as a postal matter conveyed on the conveyor belt 8. A fluorescent barcode (identification information) is printed on the letter 9, and the fluorescent barcode scanner 2 reads this fluorescent barcode. Note that this embodiment will explain detection and recognition of a fluorescent barcode, but the invention is not limited to the fluorescent barcode. Barcode detection and recognition processes to be described in this embodiment can also be applied to a visible light barcode and phosphorescence barcode.

The fluorescent barcode recognition unit 5 is an image processing unit which processes a read image which is read by the fluorescent barcode scanner 2.

The operation unit 1 can be configured by, for example, a PC (personal computer). Likewise, the control unit 3 can also be configured by, for example, a PC. Likewise, the fluorescent barcode recognition unit 5 can also be configured by, for example, a PC.

The communication cable 7 connects the fluorescent barcode scanner 2 and fluorescent barcode recognition unit 5, and connects the HUB 6, operation unit 1, control unit 3, and fluorescent barcode recognition unit 5.

For example, as shown in FIG. 2, the fluorescent barcode scanner 2 reads an image on which a barcode is printed (ST201). The fluorescent barcode scanner 2 extracts ink-dot images from the read image and couples the ink-dot images by dot coupling/filtering coupling processing, and extracts bar components using an arbitrary threshold by binary image generation processing (ST202, ST203). Furthermore, the fluorescent barcode recognition unit 5 extracts a plurality of pixel clusters from the binary image by labeling processing, and selects bar candidates from the plurality of pixel clusters by bar candidate discrimination processing (ST204, ST205). Furthermore, the fluorescent barcode recognition unit 5 calculates a skew angle from the arrangement of the bar candidates by skew angle estimation processing, and decides a profile reference line (ST206).

Moreover, the fluorescent barcode recognition unit 5 traces contours of respective bar candidate labels by label contour tracing processing, and votes direction components (ST207, ST208). The fluorescent barcode recognition unit 5 then estimates a tilt (slant angle) of the bar candidates from the voting results by slant angle calculation processing (ST209). Then, the fluorescent barcode recognition unit 5 generates a corrected image by shift-correcting the read image in the convey direction by the estimated slant angle by angle-corrected image generation processing (ST210). The fluorescent barcode recognition unit 5 classifies respective bars included in the corrected image by individual bar determination processing, and decodes the barcode based on the arrangement of the bars by decode processing (ST211, ST212).

If the decode result is improper (NO in ST213), the fluorescent barcode recognition unit 5 assumes some different slant angles within a predetermined range, and re-generates bar candidates using the assumed different slant angles (ST214). The fluorescent barcode recognition unit 5 decodes barcodes based on the arrangements of the bar candidates re-generated based on the assumed different slant angles by decode processing, selects an optimal recognition result, and outputs the recognition result (ST215, ST216, ST217).

As for labeling after binarization, either differential binary labeling or normal binary labeling may be used. The aforementioned sequence of the barcode recognition processing is an example, and the invention is not limited to this recognition processing sequence.

Practical barcode processing will be described below. Note that the fluorescent barcode scanner 2 is calibrated in advance. That is, assume that registration of the fluorescent barcode scanner 2 is complete.

Figure 3:
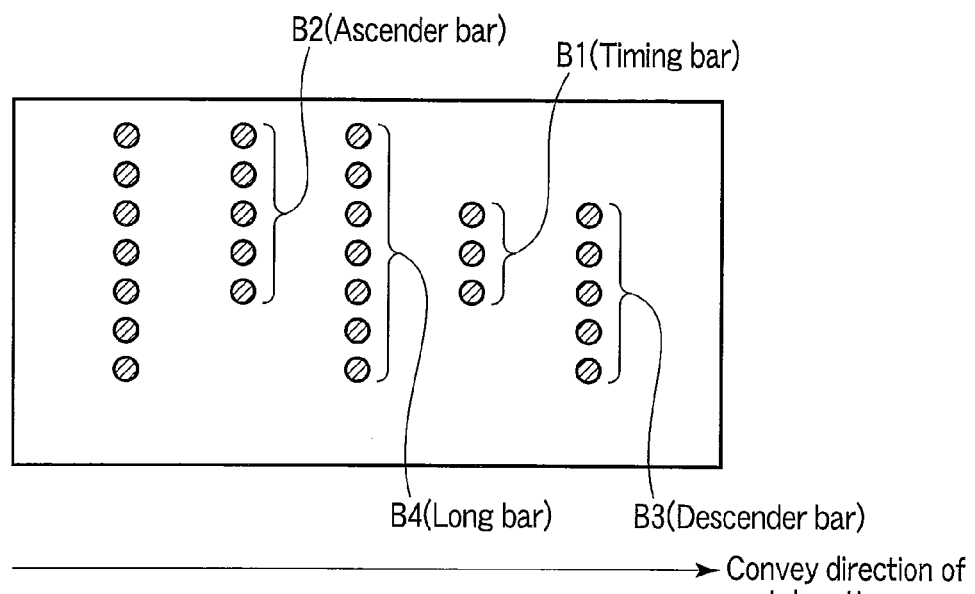
FIG. 3 is a view showing an example of a 4-state barcode.

As shown in FIG. 3, a fluorescent barcode to be recognized is, for example, a 4-state barcode. The 4-state barcode includes a timing bar B1, ascender bar B2, descender bar B3, and long bar B4. The timing bar B1 is shorter than any other bars. The ascender bar B2 is longer than the timing bar B1 only in an upper direction, and the descender bar B3 is longer than the timing bar B1 in only a lower direction. The long bar B4 is longer than the timing bar B1 in upper and lower directions. Note that the fluorescent barcode to be recognized includes an error correction function based on Reed-Solomon decoding.

Figure 4:
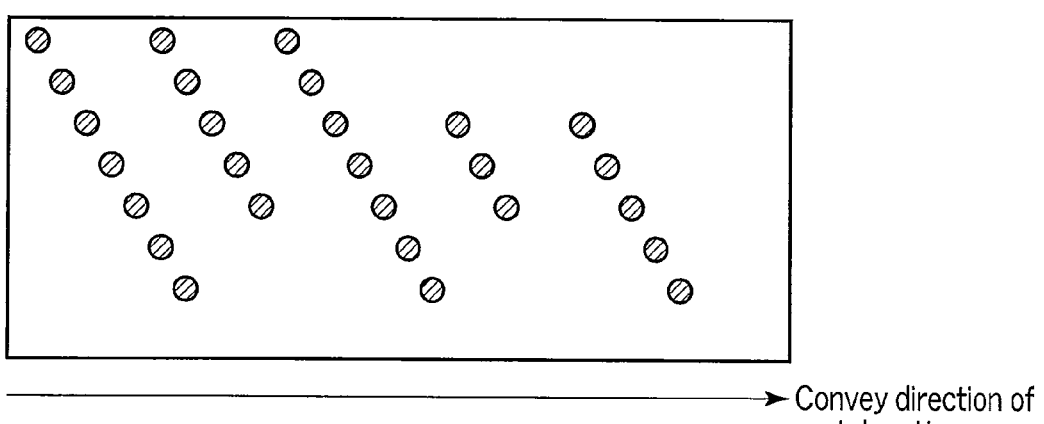
FIG. 4 is a view showing an example of a barcode configured by bars (groups of ink dots) in a slant state.

The fluorescent barcode scanner 2 reads an image of a letter (postal matter), and acquires an image of ink dots (an image of the letter on which the barcode is correctly printed), as shown in FIG. 3. Or when adjustment of the letter convey speed and the ink-ejection timing of an ink-jet printer is insufficient upon printing a barcode, the fluorescent barcode scanner 2 reads an image of a letter, and acquires an image of ink dots (an image of the letter on which a barcode in a slant state is printed), as shown in FIG. 4.

Filtering processing using a mask which is compatible to the slant state and has a given width (slant-compatible filtering processing) will be described below.

Figure 5:
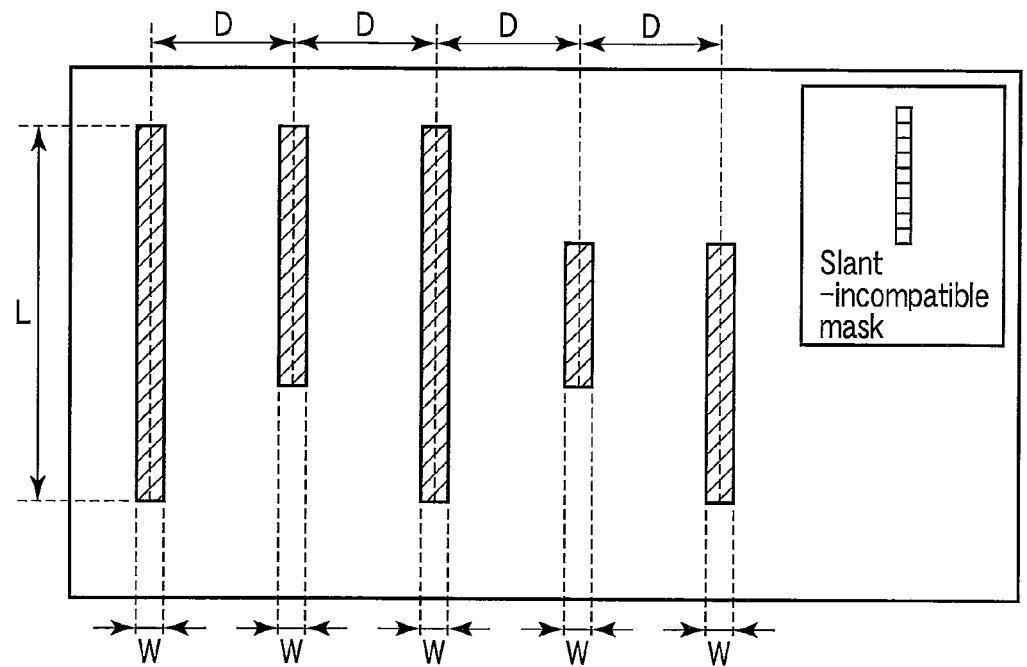
FIG. 5 is a view showing an example of the result of filtering processing and dot coupling processing for a correctly printed barcode.

For the correctly printed barcode, as shown in FIG. 3, the fluorescent barcode recognition unit 5 can generate bars by dot coupling processing, as shown in FIG. 5, after filtering using a vertically elongated mask with a small width (for example, a mask corresponding to one line). As a filtering method at that time, either median filtering or maximum value filtering may be used.

However, such filtering using the vertically elongated mask with the small width is not suited to recognition processing of a barcode configured by bars in the slant state. Hence, this embodiment applies filtering using a vertically elongated mask having a given width (a mask corresponding to a plurality of lines). For example, assume that each of bars which configure a barcode is formed by a plurality of ink dots, and respective bars are laid out to have a predetermined interval D (see FIG. 5). For a barcode defined in this way, the fluorescent barcode scanner 2 filters the read image using a mask which has a width smaller than the predetermined interval D and larger than a width W (see FIG. 5) of one bar, and corresponds to a length L (see FIG. 5) of one longest bar. The fluorescent barcode recognition unit 5 extracts a group of a plurality of ink dots based on this filtering result, couples the plurality of ink dots in the extracted group, detects one bar based on the coupling result, and recognizes a barcode configured by a plurality of detected bars.

Figure 6:
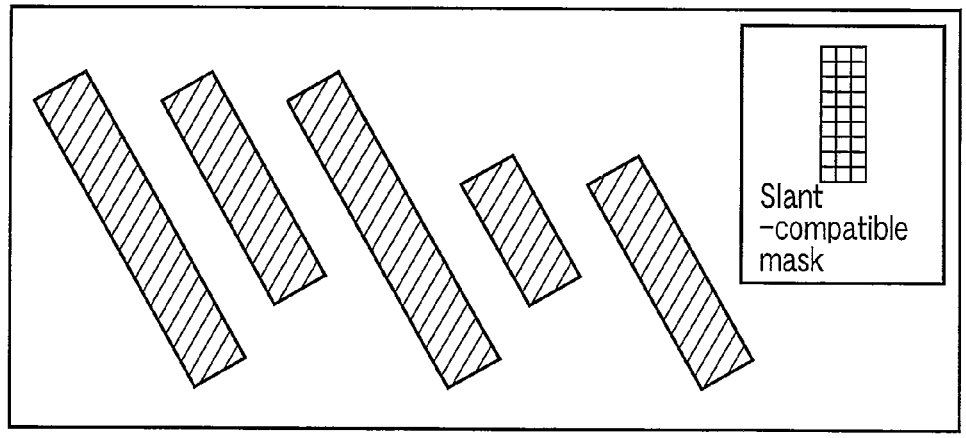
FIG. 6 is a view showing an example of the result of slant-compatible filtering processing and dot coupling processing for a barcode in the slant state.

That is, for an image of a letter on which a barcode is correctly printed, bars can be detected by filtering using the mask with the small width (for example, the mask corresponding to one line), as shown in FIG. 5. However, for an image of a letter on which a barcode configured by bars in the slant state is printed, the filtering using the mask shown in FIG. 5 does not suffice. Hence, by slant-compatible filtering using the wide mask (for example, the mask which has a width larger than each bar width and a length larger than the longest bar), as shown in FIG. 6, both the correctly recorded bar and that in the slant state can be detected.

At this time, in order to speed up the filtering processing, a maximum luminance value within a mask range may be set, and pixels with the maximum luminance value may be extracted. Alternatively, an X-th luminance value upon sorting all pixels within the mask range in the luminance order may be set, and pixels with the X-th luminance value may be extracted.

The fluorescent barcode recognition unit 5 extracts a group of a plurality of ink dots by filtering, couples the plurality of ink dots in the extracted group, and generates a binary image based on the coupling result. For example, the fluorescent barcode recognition unit 5 generates a binary image by density binarization processing based on a threshold, which is calculated based on the density histogram of an image by, e.g., the Otsu's method. Alternatively, the fluorescent barcode recognition unit 5 may generate a binary image by binarization processing based on a fixed threshold or by differential binarization processing.

Then, the fluorescent barcode recognition unit 5 applies labeling processing to the binary image. The labeling processing is processing for registering coupled pixels extracted by the binarization processing as a cluster. There are, for example, four or eight directions as those to confirm coupling.

After that, the fluorescent barcode recognition unit 5 determines if the label extracted by the labeling processing is suitable as a bar candidate. That is, the fluorescent barcode recognition unit 5 determines if the label extracted by the labeling processing has an appropriate size as a bar candidate. For example, when a letter background having a fluorescent pattern shines, a label corresponding to this fluorescent pattern is often erroneously extracted as a bar candidate. Hence, in order to exclude such wrong bar candidate, the fluorescent barcode recognition unit 5 determines if the extracted label has an appropriate size as a bar candidate. More specifically, the fluorescent barcode recognition unit 5 discriminates whether or not the extracted label has an appropriate height, width, and area as a bar candidate.

Next, the fluorescent barcode recognition unit 5 estimates a skew angle of a barcode. For example, the fluorescent barcode recognition unit 5 estimates a skew angle of a barcode configured by a plurality of discriminated labels with reference to leftmost and rightmost labels. At the time of estimation of a skew angle, the fluorescent barcode recognition unit 5 decides a barcode reference line based on the leftmost and rightmost labels.

Recognition processing for generating a corrected image by estimating a slant angle from the bar contour tracing result, and recognizing a barcode in the corrected image (primary recognition processing) will be described below. Note that this primary recognition processing can be practiced in combination with the aforementioned slant-compatible filtering processing or solely.

Figure 7:
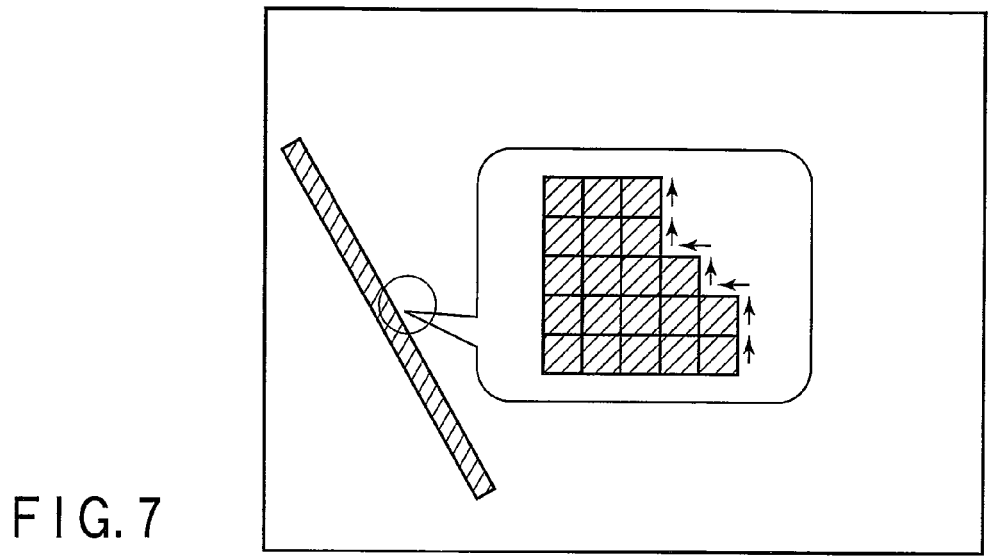
FIG. 7 is a view for explaining label contour tracing processing.

Estimation of a slant angle will be described first. A contour portion (edge portion) of each label discriminated by the aforementioned label discrimination processing is as shown in FIG. 7. FIG. 7 is an enlarged view of the contour portion (edge portion) of the discriminated label. As shown in FIG. 7, the fluorescent barcode recognition unit 5 traces the contour of the discriminated label. Arrows in FIG. 7 indicate label contour tracing processing.

Figure 8:
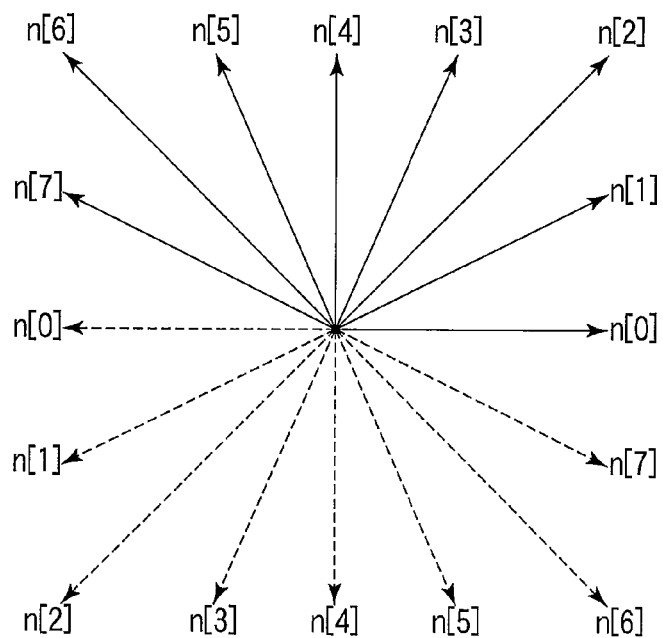
FIG. 8 is a view showing voting direction components in eight directions at the time of contour tracing.

The fluorescent barcode recognition unit 5 obtains a sequence of direction components by the label contour tracing processing. Furthermore, the fluorescent barcode recognition unit 5 delimits X- and Y-moving directions every two components for the sequence of direction components, and votes eight directions (see FIG. 8) whose positive and negative directions are not defined, thus obtaining direction voting components. Moreover, the fluorescent barcode recognition unit 5 repeats similar voting for respective discriminated labels, and calculates an estimated slant angle θ from the obtained direction voting components using:

$$x = \frac{(2*n[1] + 2*n[2] + n[3]) - (n[5] + 2*n[6] + 2*n[7])}{(n[1] + 2*n[2] + 2*n[3]) + 2*n[4] + (2*n[5] + 2*n[6] + n[7])}$$

$$\theta = \tan^{-1} x$$

As shown in FIG. 9, the fluorescent barcode recognition unit 5 generates a corrected image using the estimated slant angle θ calculated based on the voting results of contour tracing of the respective discriminated labels, and the reference line decided at the time of the skew estimation processing. That is, the fluorescent barcode recognition unit 5 shifts pixels according to horizontal shift widths (w) based on the estimated slant angle θ and heights (distances) from the reference line (coordinate values), thereby generating a corrected image.

Note that the fluorescent barcode recognition unit 5 calculates the horizontal shift width (w) at each height (v) based on a coordinate h in the bar longitudinal direction of the reference line and the estimated slant angle (θ) using:

$$w = (v-h)\tan\theta$$

Note that the fluorescent barcode recognition unit 5 reverses the sign of the horizontal shift width (w) depending on whether a pixel to which the horizontal shift width (w) is to be applied is located on the upper or lower side of the reference line.

When the corrected image is generated, as shown in FIG. 9, a bar in the corrected image is a non-slanted bar, i.e., a correctly printed bar. Hence, by applying the barcode recognition processing to this corrected image, a barcode can be recognized with high accuracy.

In order to allow the fluorescent barcode recognition unit 5 to attain efficient voting of slant angle estimation, the fluorescent barcode recognition unit 5 may select only a long bar candidate (longest bar candidate) as a voting target from the discriminated labels, and may estimate a slant angle using the bar candidate as the voting target. When, for example, the number of bar candidates is large, the fluorescent barcode recognition unit 5 may further sample only some bars in turn from a long bar candidate (longest bar candidate) as voting targets, and may estimate a slant angle using the bar candidates as the voting targets, for the purpose of a still higher processing speed. Alternatively, the fluorescent barcode recognition unit 5 may select only bar candidates having a given width or less (longest bar candidate) as voting targets, and may estimate a slant angle using the bar candidates as the voting targets.

Figure 10:
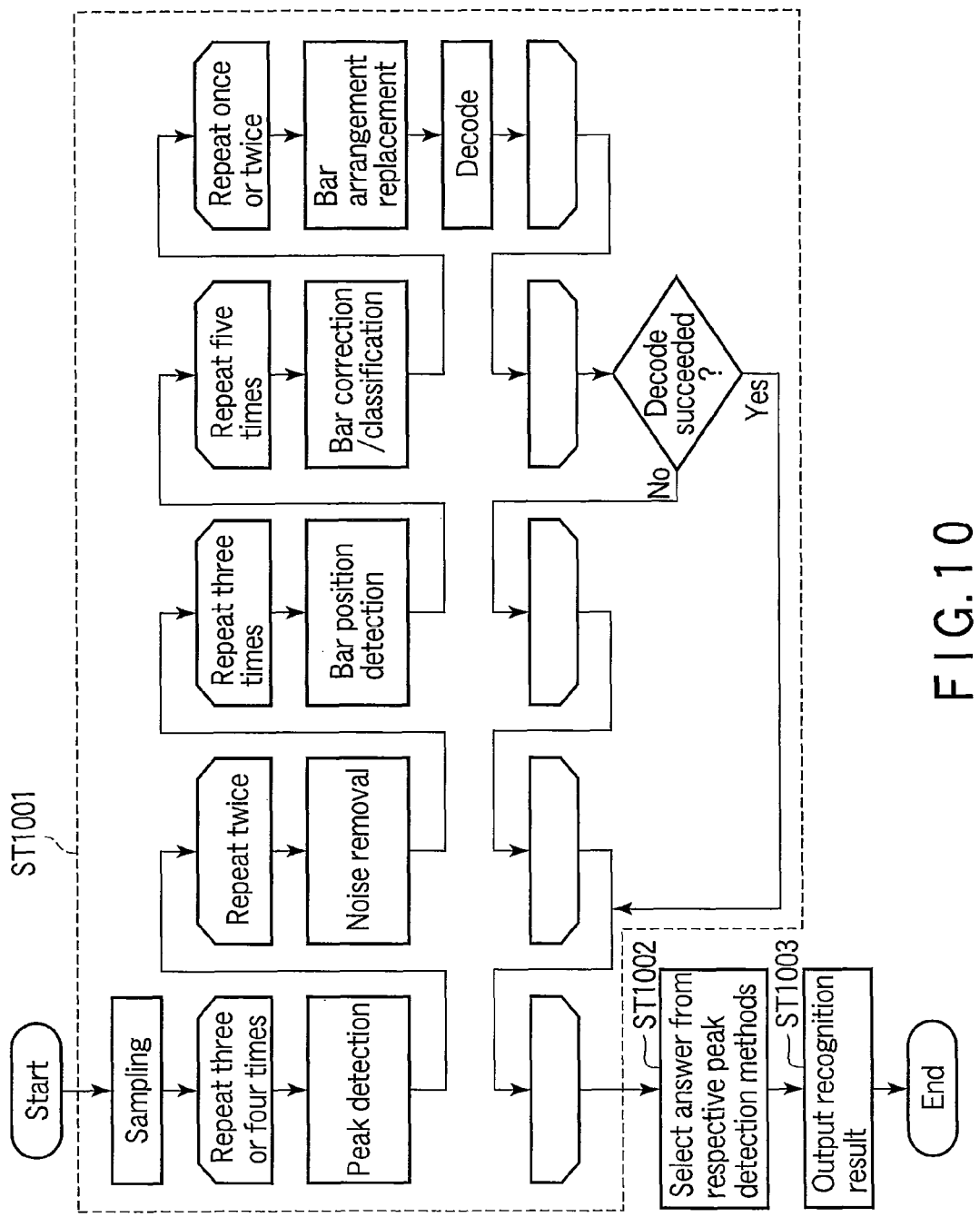
FIG. 10 is a flowchart showing an example of recognition processing for a corrected image.

An example of recognition processing for the corrected image will be described below with reference to FIG. 10. The arrangement of bars is input as input information, and the input information is decoded to acquire address information (ST1001). When a large number of decode results are obtained, an appropriate decode result is adopted (ST1002). For example, an appropriate decode result is selected based on an error correction count. After the appropriate decode result is selected, a recognition result corresponding to the decode result is output (ST1003).

When the recognition result obtained by the recording processing for recognizing a barcode in the aforementioned corrected image (primary recognition processing) is inappropriate, the fluorescent barcode recognition unit 5 executes re-recognition processing (secondary recognition processing). In the re-recognition processing, some different slant angles are assumed within a predetermined range, and bar candidates are re-generated based on the assumed different slant angles. Then, decode processing decodes barcodes based on the arrangements of bar candidates re-generated using the assumed different slant angles, and selects an optimal recognition result (decode result). Details of this processing will be described below.

Note that this secondary recognition processing can be practiced in combination with the aforementioned slant-compatible filtering processing, in combination with the aforementioned slant-compatible filtering processing and primary recognition processing, or solely.

Figure 11:
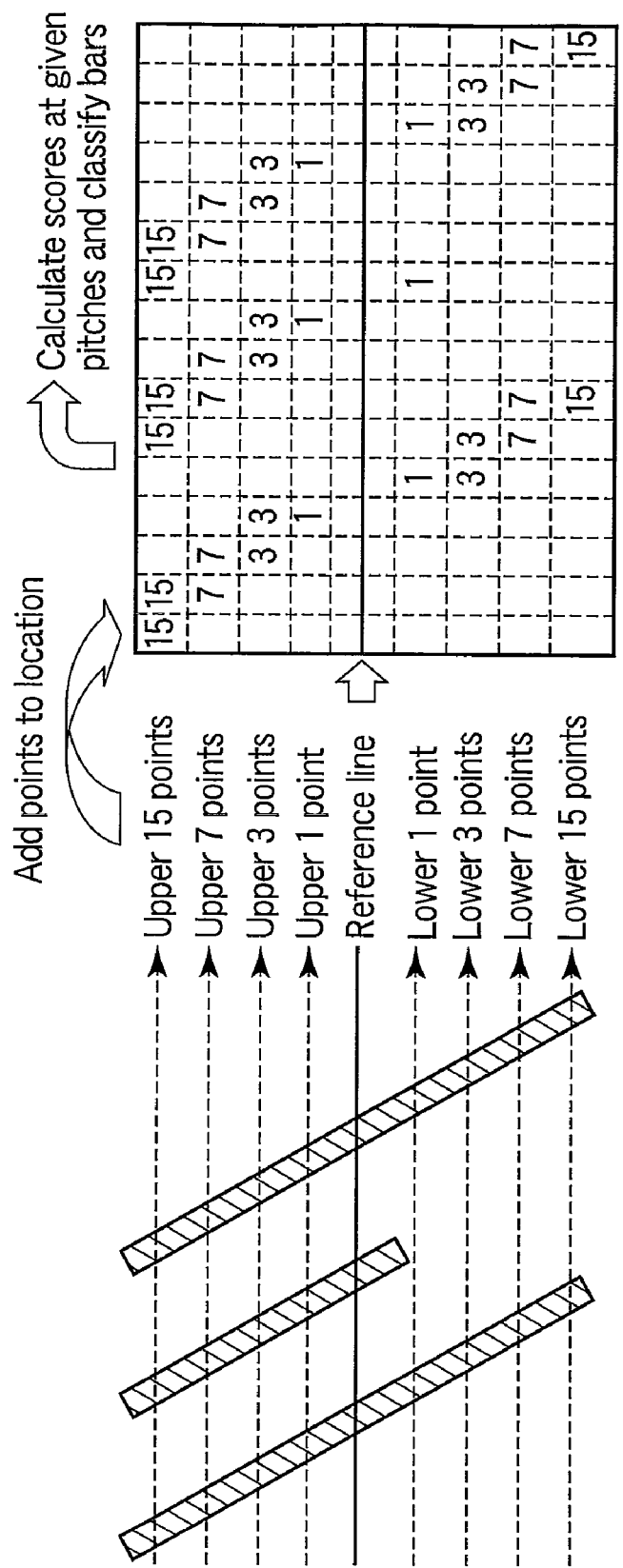
FIG. 11 is a view for explaining generation of a score map.

As shown in FIG. 11, the fluorescent barcode recognition unit 5 selects a bar candidate based on a point-addition profile method which adds upper and lower points at given pitches in accordance with heights (distances) from the reference line. That is, as shown in FIG. 11, points are given to locations of extracted pixels which configure each discriminated label to generate a score map, scores are calculated at given pitches based on this score map, and a bar candidate is selected based on the calculation result. As for a bar in the slant state, the score position deviates more with increasing distance from the reference line. That is, the bar in the slant state cannot be selected as a bar candidate even when scores are calculated at given pitches based on the score map.

Figure 12:
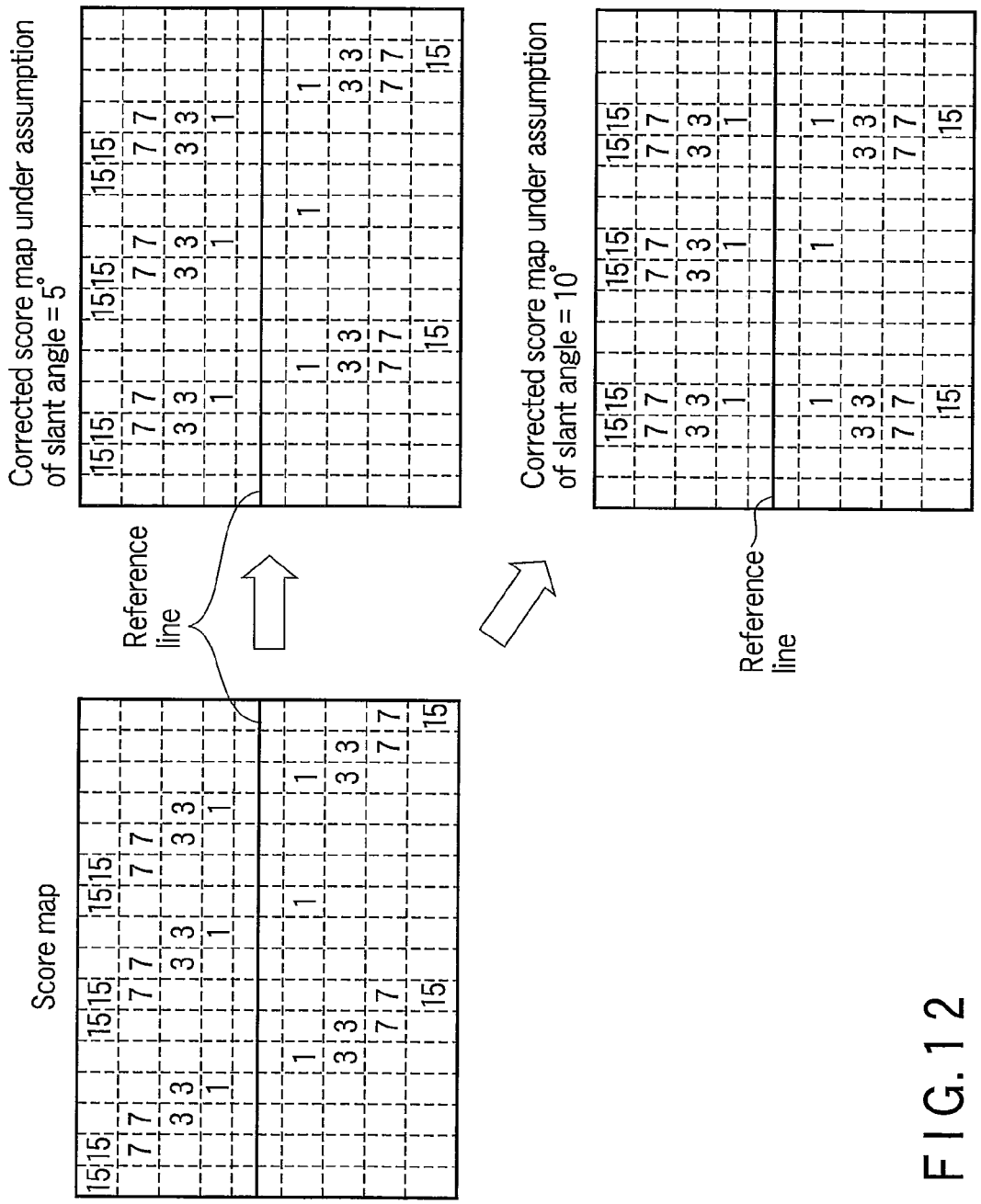
FIG. 12 is a view for explaining generation of corrected score maps based on assumed slant angles.

Hence, some different slant angles are assumed within a predetermined range. For example, the predetermined range may be calculated based on allowable slant angles in the specification, or may be calculated based on the tendency of slant angles which have actually occurred. Subsequently, the fluorescent barcode recognition unit 5 assumes some different aslant angles (for example, 5° and 10°, as shown in FIG. 12) within the predetermined range, and generates a corrected score map according to each assumed slant angle by shifting pixels according to horizontal shift widths based on the assumed slant angle and heights (distances) from coordinates of the reference line. Then, the fluorescent barcode recognition unit 5 calculates scores based on respective corrected score maps, and selects a bar candidate based on the calculation result. Furthermore, the fluorescent barcode recognition unit 5 decodes a barcode based on the arrangement of a plurality of bar candidates selected based on each corrected score map.

The fluorescent barcode recognition unit 5 outputs the recognition result of the barcode based on the decode result of the barcode. For example, when a barcode can be correctly decoded from the arrangement of a plurality of bar candidates selected based on a certain corrected score map, the fluorescent barcode recognition unit 5 outputs the recognition result of the barcode based on this decode result. Alternatively, the fluorescent barcode recognition unit 5 outputs the recognition result of the barcode based on the decode result with the fewest error correction count.

Note that the secondary recognition processing may use the corrected image in the primary recognition processing. That is, a score map may be generated based on the corrected image, a plurality of bar candidates may be selected based on the score map, and a barcode may be decoded based on the arrangement of the plurality of selected bar candidates. Alternatively, a corrected score map may be generated based on the corrected image, a plurality of bar candidates may be selected based on the corrected score map, and a barcode may be decoded based on the arrangement of the plurality of selected bar candidates.

As described above, the barcode processing apparatus of this embodiment can accurately recognize even a barcode configured by bars in the slant state. For example, the aforementioned slant-compatible filtering processing can enhance the recognition rate of barcodes. Also, the aforementioned primary recognition processing can enhance the recognition rate of barcodes. Furthermore, the aforementioned secondary recognition processing can enhance the recognition rate of barcodes. Moreover, a combination of at least two out of the slant-compatible filtering processing, primary recognition processing, and secondary recognition processing can further enhance the recognition rate of barcodes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A barcode processing apparatus comprising:
a reading unit configured to read an image of a barcode configured by a plurality of bars laid out at a predetermined interval, each bar being formed by a plurality of ink dots; and
a barcode recognition unit configured to filter the read image using a mask which has a width smaller than the predetermined interval and larger than a width of one bar, and corresponds to a length of one bar so as to extract a group of a plurality of ink dots, to couple the plurality of ink dots in the extracted group, to detect one bar based on the coupling result, and to recognize a barcode configured by a plurality of detected bars.

2. The apparatus of claim 1, wherein the barcode recognition unit is configured to extract pixels having a maximum luminance value within a range of the mask.

3. The apparatus of claim 1, wherein the barcode recognition unit is configured to extract pixels having an X-th (X: an integer) luminance value within a range of the mask.

4. A barcode processing apparatus comprising:
a reading unit configured to read an image of a barcode configured by a plurality of bars laid out at a predetermined interval along a barcode reference line; and
a barcode recognition unit configured to extract a plurality of bar candidates from the read image, to estimate a slant angle of a predetermined bar candidate of the plurality of extracted bar candidates with respect to the barcode reference line, to correct the read image based on the estimated slant angle, and to recognize a barcode configured by a plurality of bars from the corrected image.

5. The apparatus of claim 4, wherein the barcode recognition unit is configured to estimate the slant angle by contour tracing of the predetermined bar candidate.

6. The apparatus of claim 4, wherein the barcode recognition unit is configured to select a bar candidate longer than a predetermined length from the plurality of bar candidates, and to estimate the slant angle based on the selected bar candidate.

7. The apparatus of claim 4, wherein the barcode recognition unit is configured to sample bar candidates at a predetermined interval from the plurality of bar candidates, and to estimate the slant angle based on the sampled bar candidates.

8. The apparatus of claim 4, wherein the barcode recognition unit is configured to select bar candidates having widths smaller than a predetermined width from the plurality of bar candidates, and to estimate the slant angle based on the selected bar candidates.

9. A barcode processing apparatus comprising:
a reading unit configured to read an image of a barcode configured by a plurality of bars laid out at a predetermined interval along a barcode reference line; and
a barcode recognition unit configured to assume a plurality of different slant angles of the bars of the barcode with respect to the barcode reference line, to correct a plurality of bar candidates included in the read image based on the assumed slant angles, to decode the barcode based on the arrangement of the plurality of corrected bar candidates, and to select a best decode result of decode results of the barcode obtained in correspondence with the assumed slant angles.

10. The apparatus of claim 9, wherein the barcode recognition unit is configured to correct the read image based on the assumed slant angles, to decode the barcode based on the arrangement of the plurality of bar candidates included in each of the corrected images, and to select a best decode result of decode results of the barcode obtained in correspondence with the assumed slant angles.

11. The apparatus of claim 9, wherein the barcode recognition unit is configured to generate a score map which scores respective pixels that configure a plurality of bar candidates included in the read image in accordance with distances from the reference line common to the plurality of bar candidates, to correct the score map based on the assumed slant angles, to decode the barcode based on the arrangement of the plurality of bar candidates included in each of the corrected score maps, and to select a best decode result of decode results from the plurality of corrected score maps obtained in correspondence with the respective slant angles.

12. The apparatus of claim 9, wherein the barcode recognition unit is configured to select a decode result with a fewest error correction count as a best decode result.

13. A barcode processing method comprising:
reading an image of a barcode configured by a plurality of bars laid out at a predetermined interval, each bar being formed by a plurality of ink dots; and
filtering the read image using a mask which has a width smaller than the predetermined interval and larger than a width of one bar, and corresponds to a length of one bar so as to extract a group of a plurality of ink dots, coupling the plurality of ink dots in the extracted group, detecting one bar based on the coupling result, and recognizing a barcode configured by a plurality of detected bars.

14. A barcode processing method comprising:
reading an image of a barcode configured by a plurality of bars laid out at a predetermined interval along a barcode reference line; and
extracting a plurality of bar candidates from the read image, estimating a slant angle of a predetermined bar candidate of the plurality of extracted bar candidates with respect to the barcode reference line, correcting the read image based on the estimated slant angle, and recognizing a barcode configured by a plurality of bars from the corrected image.

15. A barcode processing method comprising:
reading an image of a barcode configured by a plurality of bars laid out at a predetermined interval along a barcode reference line; and
assuming a plurality of different slant angles of the bars of the barcode with respect to the barcode reference line, correcting a plurality of bar candidates included in the read image based on the assumed slant angles, decoding the barcode based on the arrangement of the plurality of corrected bar candidates, and selecting a best decode result of decode results of the barcode, obtained in correspondence with the assumed slant angles.

* * * * *